Dec. 29, 1925.                                                1,567,229
F. M. BOHLER
SPEED RETARDING DEVICE FOR AIRPLANES
Filed June 3, 1925
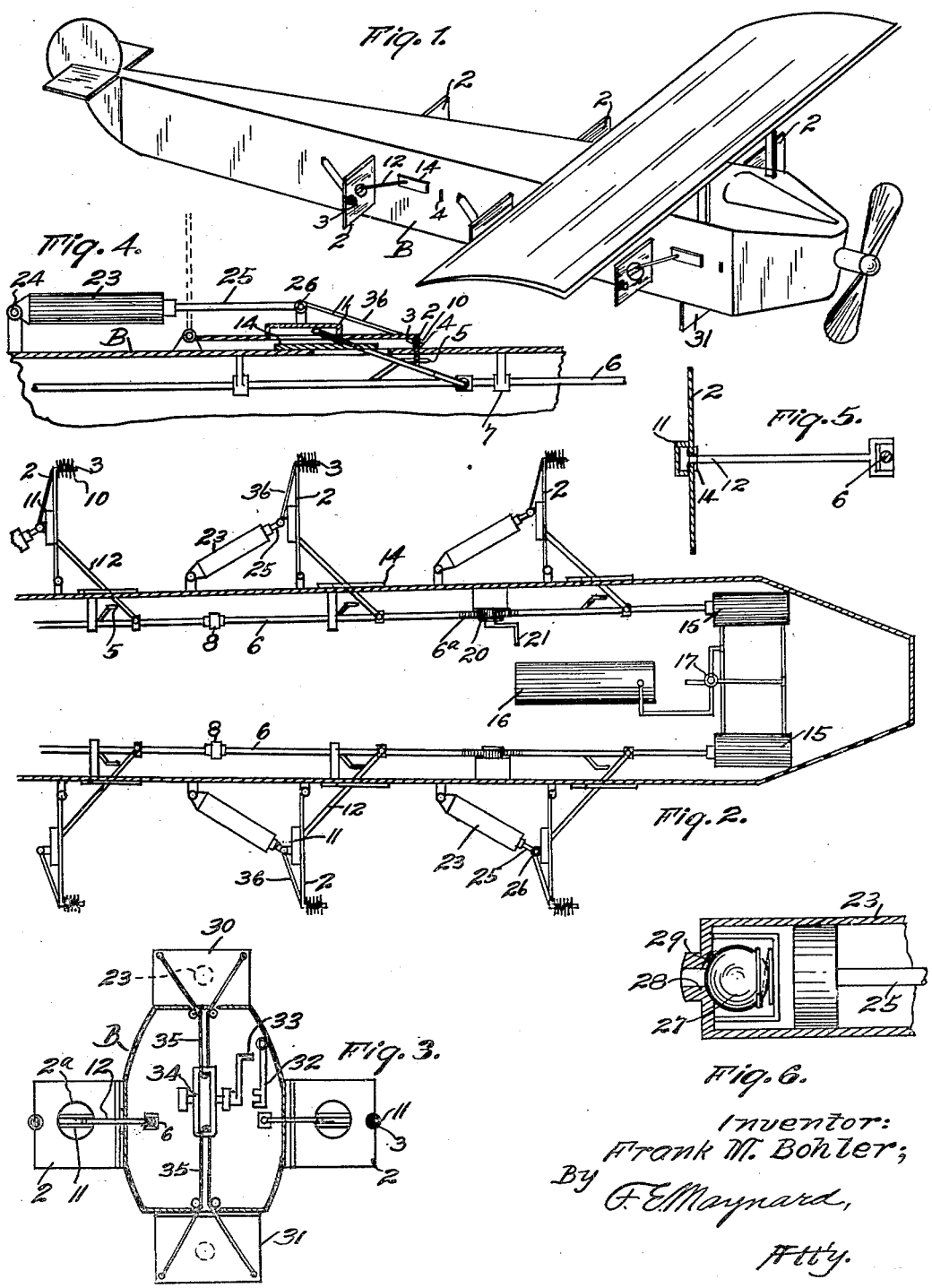
Inventor:
Frank M. Bohler;
By G. E. Maynard,
Atty.

Patented Dec. 29, 1925.

1,567,229

UNITED STATES PATENT OFFICE.

FRANK M. BOHLER, OF LOS ANGELES, CALIFORNIA.

SPEED-RETARDING DEVICE FOR AIRPLANES.

Application filed June 3, 1925. Serial No. 34,672.

*To all whom it may concern:*

Be it known that I, FRANK M. BOHLER, a citizen of the United States, and resident of Los Angeles, Los Angeles County, State of California, have invented new and useful Improvements in Speed-Retarding Devices for Airplanes, of which the following is a specification.

This invention relates to airplanes and particularly to a means for retarding the speed of flight.

An object of the invention is to provide a set of stiff or rigid plates forming braking plates or wings, and to provide power means to effect a perfect control of the action of the braking plates or blades. An object is to provide a power means for concurrently pulling the braking plates to a closed position close along the sides of the airship or airplane to which they may be applied. Another object is to provide a cushion means for controlling the opening action of the braking plates.

An object is to provide an auxiliary, manually tripped, quick action, emergency stop device.

Other objects and advantages will be made manifest in the following specifications of apparatus embodying the invention.

Figure 1 is a perspective of an airplane with all plates in open, stopping position.

Figure 2 is a plan and sectional view of the airplane body, showing the stopping apparatus.

Figure 3 is a vertical cross-section showing the auxiliary blades thrown open.

Figure 4 is a detail of one of the plates, closed and locked.

Figure 5 is a detail showing an edge of a plate and the track for the draw-link.

Figure 6 is a detail section of the pneumatic cushion and its inlet valve.

I hinge a set of upright plates 2 of suitable material along the sides of the airplane body, these plates closing forwardly in against the sides so as to lie flat and reduce resistance. Each plate has a hasp 3 to enter a pocket or recess 4 and be engaged by a bolt 5, a series of which are secured on elongated piston rods 6 slideably mounted in bearings 7 along the sides of the body B. These rods may have universal joints 8 if the body is curved along its sides.

Springs 10 serve to help thrust open the front edges of the plates 2 when these are unbolted by shifting back the rods 6.

Each plate 2 has on its back face a box-track 11 closed at its ends and along the track slides the outer end of a draw-link 12.

Each link passes in through a slot 13 for it in the body wall and each link carries a cover 14 closing the slot. The inner ends of the draw-links are attached pivotally to the piston rods 6 which extend forward and into double action cylinders 15 to opposite ends of which fluid pressure, as highly compressed oxygen from a tank 16, is supplied by a suitable four-way valve 17, which is located in the control pit of the craft.

When pressure forces the pistons in the cylinders 15 forward the piston rods are pulled forward and the plates 2 are swung in and bolted by bolts 5. The draw-links have some lost motion to allow for locking the bolts.

When it is desired to check the flight speed, the aviator turns the valve to exhaust the rear end of the cylinders thus allowing the plates to open, first under thrust of springs 10 and later by air pressure against the faces of the plates.

When fully open the plates 2 are limited and held out by the draw-links 12. To close the plates, either while in flight or at rest, fluid pressure is reversed to the rear ends and the front ends of the cylinders are exhausted.

Means are provided that the piston rods 6 may be manually operated in case of failure of the power apparatus. As here shown each rod has a rack 6ª engaged by a pinion 20 which can be turned by a detachable crank 21.

An important feature of the device consists of means forming a substantial, yieldable cushion for each braking plate 2 as it opens out. Preferably a pneumatic cylinder or shell 23 is pivotally attached at 24 to the body B, behind the plate, and has a piston rod 25 connected to its respective plate at 26. Thus, when a plate 2 is closed the rod 25 is drawn outward in its shell 23, and both lie along the body. As a plate opens out its pneumatic shell and rod oscillate out and compressed air in the shell cushions the shock. Each pneumatic shell has an inlet valve 27 pressed against a seat 28 having a bleeder groove 29 allowing "slow leak", and a gradual opening of the plate attached. The inlet valve 27 allows fast reverse of the pneumatic cylinder rod as the plate closes.

For emergency stopping, I provide top and bottom blades 30—31 hinged to open out. These may be instantly released by a latch 32 adapted to hold a crank 33 of a loop 34 whose ends have bights 35 of cables attached to the blades 30—31. When the latch is tripped off the bights pull the loop 34 upright as air pressure pulls the blades open. When flight is stopped the blades are pulled in and crank 33 turned to engage latch 32, ready for future use.

The plates 2 have air holes $2^a$ to reduce shock and strain and these are progressively larger from rear to front.

Each plate 2 has suitable back braces 36 which extend out to the remote corners so as to strengthen the plates.

What is claimed is:

1. Means for braking the speed of air craft comprising a set of rigid plates hinged to the craft body to swing outward, fluid pressure control means for regulating opening, and closing, the plates, and pneumatic cushioning, piston means hingedly connected to the backs of and for bracing and controlling the opening of the plates.

2. Means for braking the speed of air craft comprising a set of rigid plates hinged to the craft body to swing outward, and fluid pressure control means for regulating opening, and for closing, the plates; said means including double action cylinders having piston rods, and draft-links connecting the rods to the plates, and manually operable means for working the said rods in emergency.

3. Means for braking the speed of air craft comprising a set of rigid plates hinged to the craft body to swing outward, and fluid pressure control means for regulating opening, and for closing, the plates; said means including double action cylinders having piston rods, and draft-links connecting the rods to the plates; said links being slidingly connected to, and limiting the opening movement of the plates.

4. Means for braking the speed of air craft comprising a set of rigid plates hinged to the craft body to swing outward, and fluid pressure control means for regulating opening, and for closing, the plates; said means including double action cylinders having piston rods, and draft-links connecting the rods to the plates; said rods having bolts for fastening the plates closed.

5. Means for braking the speed of air craft comprising a set of rigid plates hinged to the craft body to swing outward, and fluid pressure control means for regulating opening, and for closing, the plates; said means including double action cylinders having piston rods, and draft-links connecting the rods to the plates; said links entering slots in the craft body and having covers for the slots.

6. An air craft having a brake plate hinged to swing outward, a backing cushion to brace the plate as it opens, a piston rod having a locking bolt, and a link connecting the rod to the plate and providing for movement of the rod to lock the plate in closed position.

7. An airplane braking means comprising a series of plates along each side of the craft, said plates having air holes progressively larger from the rear to the front of the series.

F. M. BOHLER.